US008357878B2

(12) United States Patent
Leonhardt et al.

(10) Patent No.: US 8,357,878 B2
(45) Date of Patent: Jan. 22, 2013

(54) UV LED BASED LAMP FOR COMPACT UV CURING LAMP ASSEMBLIES

(75) Inventors: Darrin Leonhardt, Gaithersburg, MD (US); Charles H. Wood, Rockville, MD (US); Pradyumna K. Swain, Gaithersburg, MD (US)

(73) Assignee: Fusion UV Systems, Gaithersburg, MD (US)

( * ) Notice: Subject to any disclaimer, the term of this patent is extended or adjusted under 35 U.S.C. 154(b) by 199 days.

(21) Appl. No.: 12/974,335

(22) Filed: Dec. 21, 2010

(65) Prior Publication Data

US 2011/0147356 A1 Jun. 23, 2011

Related U.S. Application Data

(60) Provisional application No. 61/289,518, filed on Dec. 23, 2009.

(51) Int. Cl.
*H05B 1/00* (2006.01)
*A21B 2/00* (2006.01)

(52) U.S. Cl. ........ 219/201; 219/390; 219/405; 219/411; 392/416; 392/418; 118/725; 118/724; 118/50.1

(58) Field of Classification Search .................. 219/201, 219/390, 405, 411; 392/416, 418; 118/724, 118/725, 50.1
See application file for complete search history.

(56) References Cited

U.S. PATENT DOCUMENTS

| | | | | |
|---|---|---|---|---|
| 6,570,134 | B2 * | 5/2003 | Suzuki et al. | 219/390 |
| 2011/0089166 | A1 * | 4/2011 | Hunter et al. | 219/647 |

* cited by examiner

*Primary Examiner* — Shawntina Fuqua
(74) *Attorney, Agent, or Firm* — Lowenstein Sandler PC

(57) ABSTRACT

An ultraviolet (UV) LED-based lamp for UV curing lamp assemblies is disclosed. An array of UV emitting LEDs are packaged together and arranged along the length of a cylindrical lens to form a UV LED-based optical component assembly. The UV LED-based optical component assembly may be made to be modular. A UV LED lamp assembly may comprise a plurality of UV LED-based optical component assemblies arranged around a workpiece tube. The workpiece tube may be filled with an inert gas and may be made of quartz or glass. One or more curved back reflectors may be placed opposite the LED UV LED-based optical component assemblies to collect UV light escaping the workpiece tube and refocus the light to the other side of the workpiece. The UV LEDs may be arranged on a single surface or a multi-level tiered platform.

19 Claims, 6 Drawing Sheets

UV LED BASED LAMP FOR COMPACT UV CURING LAMP ASSEMBLIES

CROSS-REFERENCE TO RELATED APPLICATION

This application claims the benefit of U.S. provisional patent application No. 61/289,518 filed Dec. 23, 2009, the disclosure of which is incorporated herein by reference in its entirety.

FIELD OF THE INVENTION

The invention relates generally to ultraviolet (UV) curing lamp assemblies, and more particularly, to a light-emitting diode (LED)-based lamp for UV curing lamp assemblies.

BACKGROUND OF THE INVENTION

Radiant energy is used in a variety of manufacturing processes to treat surfaces, films, and coatings applied to a wide range of materials. Specific processes include, but are not limited to, curing (i.e., fixing, polymerization), oxidation, purification, and disinfection. Processes employing radiant energy to polymerize or effect a desired chemical change are rapid and often less expensive compared to a thermal treatment. The radiation can also be localized to control surface processes and allow preferential curing only where the radiation is applied. Curing can also be localized within the coating or thin film to interfacial regions or in the bulk of the coating or thin film. Control of the curing process is achieved through selection of the radiation source type, physical properties (for example, spectral characteristics), spatial and temporal variation of the radiation, and curing chemistry (for example, coating composition).

A variety of radiation sources are used for curing, fixing, polymerization, oxidation, purification, or disinfections applications. Examples of such sources include, but are not limited to, photon, electron, or ion beam sources. Typical photon sources include, but are not limited to, arc lamps, incandescent lamps, electrodeless lamps and a variety of electronic and solid-state sources (i.e., lasers). Conventional arc type UV lamp systems and microwave-driven UV lamp systems use tubular bulb envelopes made of fused quartz glass or fused silica.

FIG. 1 is a perspective view of a microwave-powered UV curing lamp assembly showing an irradiator and a light shield assembly in the prior art. FIG. 2 is a partial cross-sectional view of the lamp assembly of FIG. 1 showing a half-elliptical primary reflector and a light source of circular cross-section. FIG. 3 is a partial cross-sectional internal view of the light shield assembly of FIG. 1 showing a half-elliptical primary reflector and a light source of circular cross-section mated to a secondary reflector and end reflectors.

Referring now to FIGS. 1-3, the apparatus 10 includes an irradiator 12 and a light shield assembly 14. The irradiator 12 includes a primary reflector 16 having a generally smooth half-elliptical shape with openings 18 for receiving microwave radiation to excite a light source 20 (to be discussed herein below), and a plurality of openings 22 for receiving air flow to cool the light source 20. The light source 20 includes a lamp (e.g., a modular lamp, such as a microwave-powered lamp having a microwave-powered bulb (e.g., tubular bulb with a generally circular cross-section) with no electrodes or glass-to-metal seals). The light source 20 is placed at the internal focus of the half-ellipse formed by the primary reflector 16. The light source 20 and the primary reflector 16 extend linearly along an axis in a direction moving out of the page (not shown). A pair of end reflectors 24 (one shown) terminate opposing sides of the primary reflector 16 to form a substantially half-elliptical reflective cylinder. The light shield assembly 14 of FIG. 1-3 includes a secondary reflector 25 having a substantially smooth elliptical shape. A second pair of end reflectors 26 (one shown) terminates opposing sides of the secondary reflector 25 to form a substantially half-elliptical reflective cylinder.

A work piece tube 30 of circular cross-section is received in circular openings 28 in the end reflectors 26. The center of the openings 28 and the axis of the work piece tube 30 are typically located at the external focus of the half-ellipse formed by the primary reflector 16 (i.e., the foci of the half-ellipse formed by the secondary reflector 25). The work piece tube 28 and the secondary reflector 25 extend linearly along an axis in a direction moving out of the page (not shown).

In operation, gas in the light source 20 is excited to a plasma state by a source of radio frequency (RF) radiation, such as a magnetron (not shown) located in the irradiator 12. The atoms of the excited gas in the light source 20 return to a lower energy state, thereby emitting ultraviolet light (UV). Ultraviolet light rays 38 radiate from the light source 20 in all directions, striking the inner surfaces of the primary reflector 16, the secondary reflector 25, and the end reflectors 24, 26. Most of the ultraviolet light rays 38 are reflected toward the central axis of the work piece tube 30. The light source 20 and reflector design are optimized to produce the maximum peak light intensity (lamp irradiance) at the surface of a work product (also propagating linearly out of the page) placed inside the work piece tube 30.

Microwave-powered, UV-emitting electrodeless lamps used for the light source have several disadvantages. Microwave-powered, UV-emitting electrodeless lamps are bulky, noisy, and require a large manufacturing and distribution infrastructure due to many consumable parts, since the service lifetime of an electrodeless lamp is relatively short. With present day optics, the focused beam width of an electrodeless lamp is at best about 1 centimeter (comparable to the bulb size), which results in a large amount of wasted light energy that does not strike the work product. In addition, a large amount of energy is also wasted as heat in plasma-based lamp systems (electroded or electrodeless lamps). Since lamps often contain a small amount of mercury, they pose an environmental disposal hazard. In current operation, hazardous operating conditions for personnel when assembling and handling such lamps were alleviated with personal protective equipment and lengthy operating procedures.

Accordingly, what would be desirable, but has not yet been provided, is an environmentally friendly, efficient solid state light source that provides high peak UV curing irradiance.

SUMMARY OF THE INVENTION

The above-described problems are addressed and a technical solution is achieved in the art by providing an ultraviolet (UV) LED-based lamp for UV curing lamp assemblies. An array of UV emitting LEDs are packaged together and arranged along the length of at least one optical component configured to focus UV radiation (e.g., refractive optics, reflective optics, adaptive optics, or metamaterials) to form a UV LED-based optical component assembly. The UV LED-based optical component assembly may be made to be modular. The standard length package may be laid end-to-end to increase total irradiance of the UV LED-based optical component assembly.

A UV LED lamp assembly may comprise a plurality of UV LED-based optical component assemblies arranged around a workpiece tube, the workpiece being removably insertable from the workpiece tube. The workpiece tube may be filled with an inert gas and may be made of quartz or UV transparent material. One or more curved back reflectors may be placed on the other side of the workpiece tube, opposite the LED assembly. The curved back reflectors are configured to collect UV light escaping the workpiece tube and refocus the light to the other side of the workpiece. The curvature of the back reflector determines the working distance between the reflector and the workpiece tube.

The UV LEDs may be provided in a prepackaged or bare die form configured linearly on a single surface or arranged on multiple surfaces at various levels. For the case of a multilevel tiered platform, the sidewalls between a lower platform and at least one upper platform are angled or curved inward from the at least one upper platform to the lower platform, such that the at least one upper platform at least partially overlies the lower platform. In this way, the dies are arranged closer to each other than the case of when upper platforms are substantially perpendicular to lower platforms. As a result of the LED dies being closer to each other, the combined irradiance pattern from the plurality of LED dies has been shown to have about a 1.5 power increase per unit area over the conventional linear arrangement.

In operation, the UV LED dies emit UV radiation of a particular wavelength, which is focused onto a stationary or moving workpiece, e.g., an optical fiber, at a predetermined speed. An optical component (e.g., a cylindrical lens) focuses light into a desired irradiance pattern, which substantially matches the geometry of the workpiece.

BRIEF DESCRIPTION OF THE DRAWINGS

The present invention may be more readily understood from the detailed description of an exemplary embodiment presented below considered in conjunction with the attached drawings and in which like reference numerals refer to similar elements and in which.

It is to be understood that the attached drawings are for purposes of illustrating the concepts of the invention and may not be to scale.

DETAILED DESCRIPTION OF THE INVENTION

Figure 1:
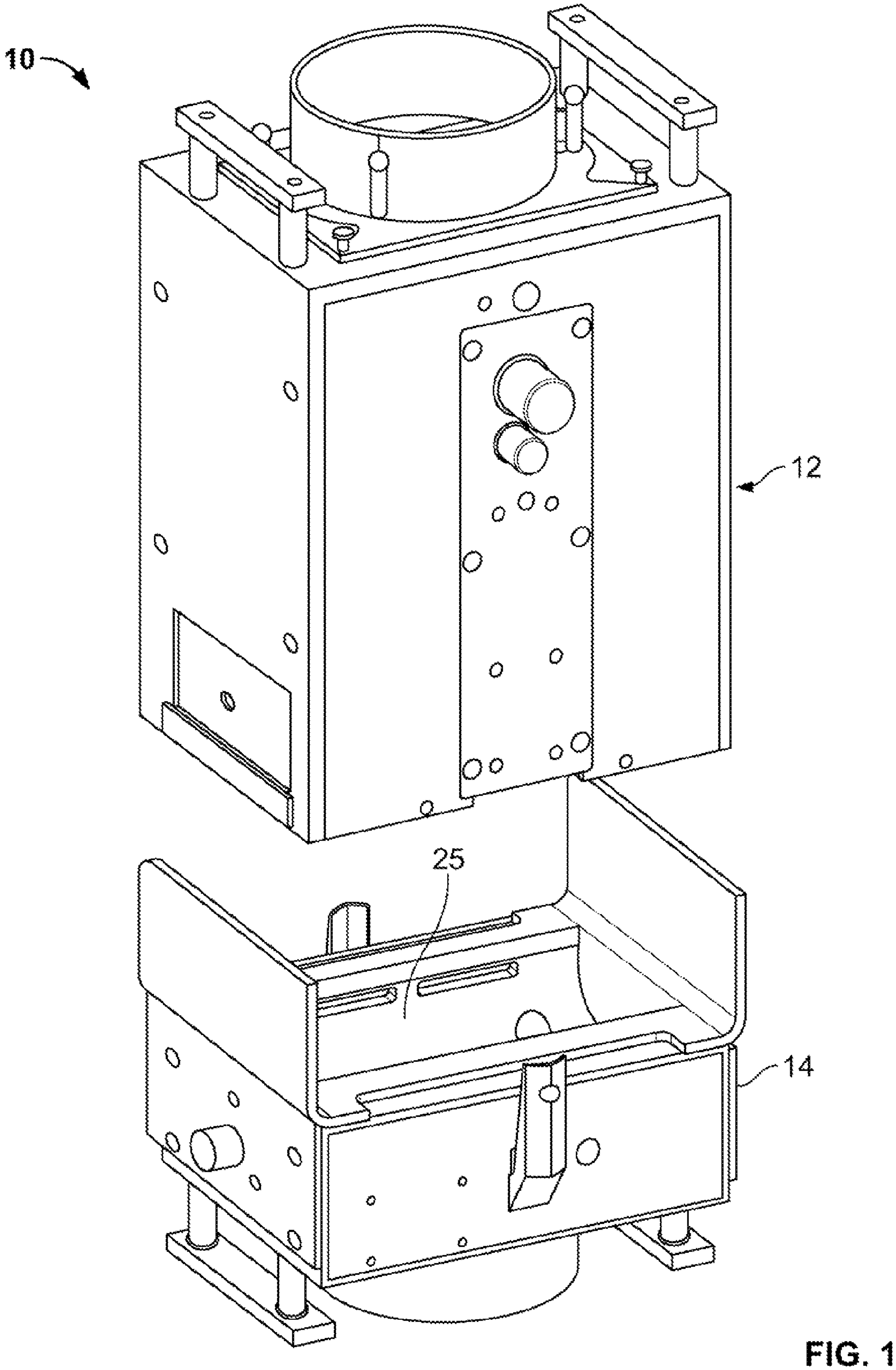
FIG. 1 (Prior Art)
FIG. 1 is a perspective view of a UV curing lamp assembly showing an irradiator and a light shield assembly in the prior art.
Figure 2:
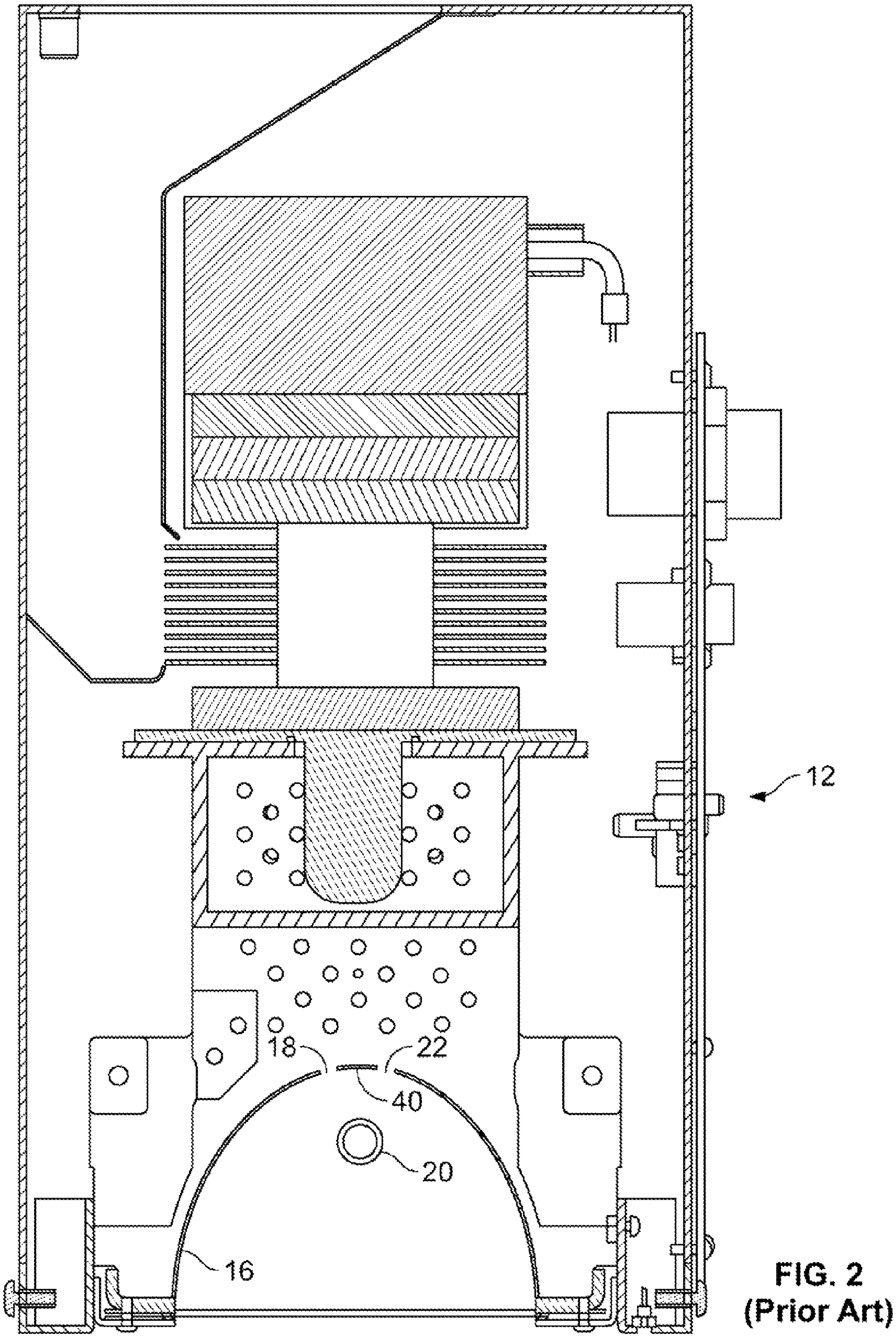
FIG. 2 (Prior Art)
FIG. 2 is a partial cross-sectional view of the lamp assembly of FIG. 1 showing a half-elliptical primary reflector and a light source of circular cross-section.
Figure 3:
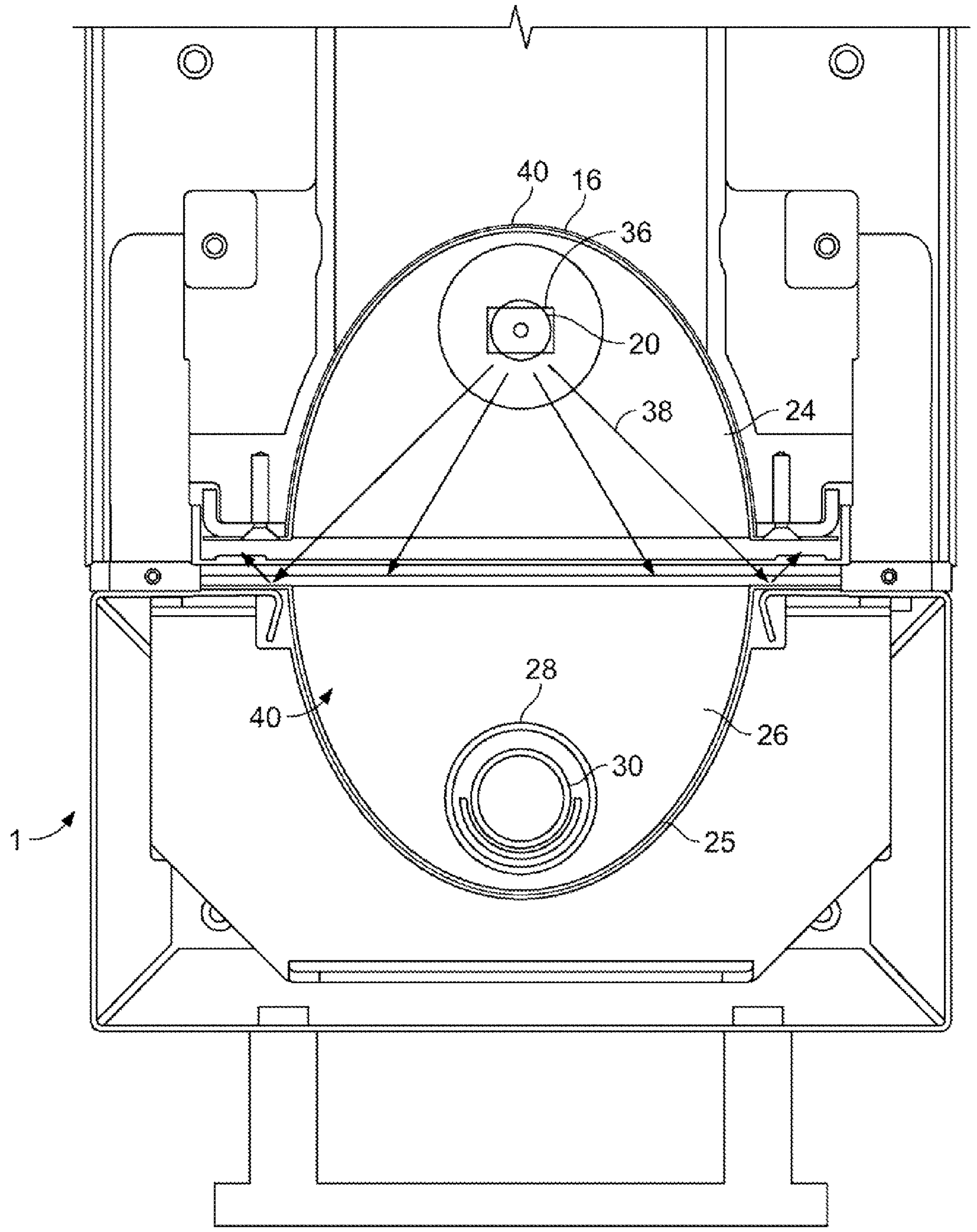
FIG. 3 (Prior Art)
FIG. 3 is a partial cross-sectional internal view of the lamp assembly interconnected with the light shield assembly of FIG. 1, showing a half-elliptical primary reflector and a light source of circular cross-section mated to a secondary reflector and end reflectors.
Figure 4:
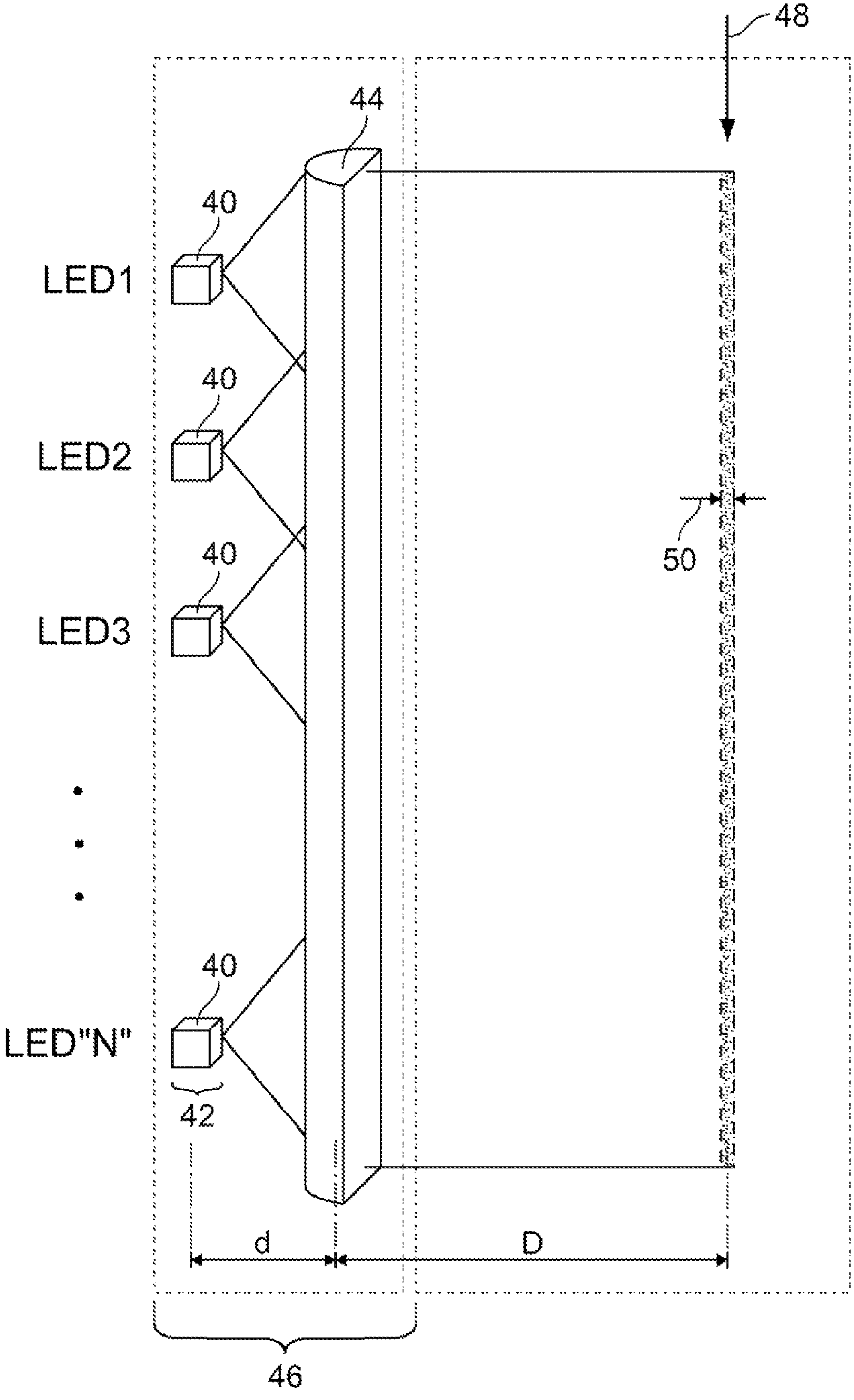
FIG. 4 shows a side view of a geometric arrangement of a UV LED array assembly for curing work products, according to an embodiment of the present invention.

FIG. 4 shows a side view of a geometric arrangement of a UV LED array assembly for curing work products, e.g., optical fibers, according to an embodiment of the present invention. A plurality of UV emitting LED dies 40 are packaged together in a linear array 42, LED1-LED "N". The UV LED dies 40 may emit a single or plurality wavelengths of light below 450 nm.

The UV LED dies 40 may be packaged with one or more optical components 44. The optical components 44, for example, may be, but are not limited to, refractive optics (e.g., lens, prism, etc.), reflective optics (e.g., mirrors), adaptive optics, metamaterials, etc. In a preferred embodiment, the one or more optical components 44 is a cylindrical lens 44 that may be removably attached to the UV LED array 42 or affixed to the UV LED dies 40 to form a UV LED-based optical component assembly 46. The UV LED-based optical component assembly 46 may be made to be modular, i.e., having a specific length and a specific number of UV LED dies 40 per unit length. The standard length package may be laid end-to-end to increase total irradiance of the UV LED-based optical component assembly 46. Irradiance uniformity along the length of the UV LED-based optical component assembly 46 may be dictated by the separation between the individual UV LED dies 40 to be discussed hereinbelow with regard to FIG. 6.

In operation, the UV LED dies 40 emit UV radiation of a particular wavelength, which is focused onto a moving workpiece 48, e.g., an optical fiber, at a predetermined speed. The cylindrical lens 44 focuses light into a desired irradiance pattern, which substantially matches the cross section (e.g., width) of the workpiece 48. In a preferred embodiment, the width 50 of the focused beam at the location of the workpiece 48 is in the range of about 0.5 to 1.0 millimeters.

A typical energy density delivered to the irradiated workpiece 48 moving at about 40 meters/second is about 0.4 Joules/cm$^2$. For an irradiance pattern with of about 0.5 mm, the relation $80=P_{LED}(W)\times N_{LED}$ holds, where $P_{LED}(W)$ is the "useful" output power of each LED die and $N_{LED}$ is the number of total LED dies. The workpiece distance, D, from the center of the cylindrical lens 44 to the workpiece 48 may vary depending on the focal length of the lens 44, but is preferably between 1 and 10 cm. The distance from the center of the half-cylindrical lens 44 to the workpiece 48 is the distance, D, while the distance from the front surfaces of the UV LED dies 40 to the center of the half-cylindrical lens 44 is the distance, d. In a preferred embodiment, d<<D.

Figure 5A:
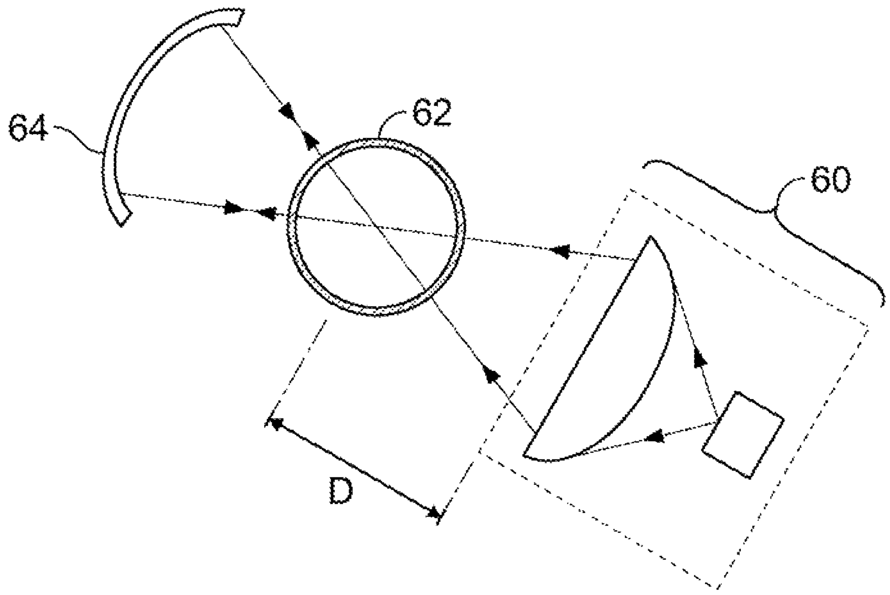
FIG. 5A shows a top view of a UV LED lamp assembly with a single UV LED array package and a single back reflector, according to an embodiment of the present invention.
Figure 5B:
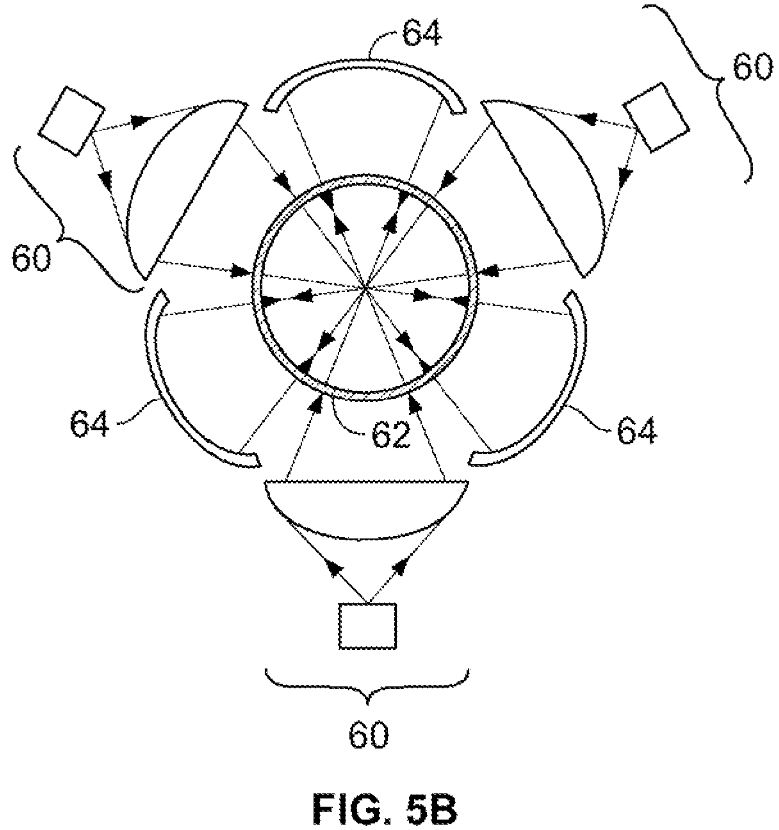
FIG. 5B shows a top view of a UV LED lamp assembly with a plurality of UV LED array packages, according to an embodiment of the present invention.

FIG. 5A shows a top view of a UV LED lamp assembly with a single UV LED array package and a single back reflector, while FIG. 5B shows a UV LED lamp assembly with a plurality of UV LED array packages (3 shown), according to an embodiment of the present invention. In principle, one or more LED array packages 60 may be arranged around a workpiece tube 62, the workpiece being removably insertable from the workpiece tube 62 (the workpiece moves into the page down the axis of the workpiece tube 62). The workpiece tube may be filled with an inert gas (i.e., substantially oxygen free). In a preferred embodiment, the workpiece tube 62 may be made of quartz. A person skilled in the art would appreciate that the workpiece tube 62 may be replaced with a less expensive glass tube that provides sufficient optical transparency. One or more curved back reflectors 64 may be placed opposite the LED array packages 60. In this example, the focal length of the curved back reflector 64 is the same as the focal length of the cylindrical lens 44, resulting in the workpiece tube 62 being placed directly between reflector 64 and the lens 44. The curved back reflectors 64 are configured to collect UV light escaping the workpiece tube 62 and refocus the light to the other side of the workpiece. The LED lamp optics (i.e., the LED array packages 60 and/or the curved back reflectors 64 may have optics that compensate for light refraction due to the workpiece tube 62.

The workpiece tube 62 needs to be periodically removed and cleaned, and therefore ought not to be incorporated in a fixed manner into the LED lamp assembly.

Figure 6A:
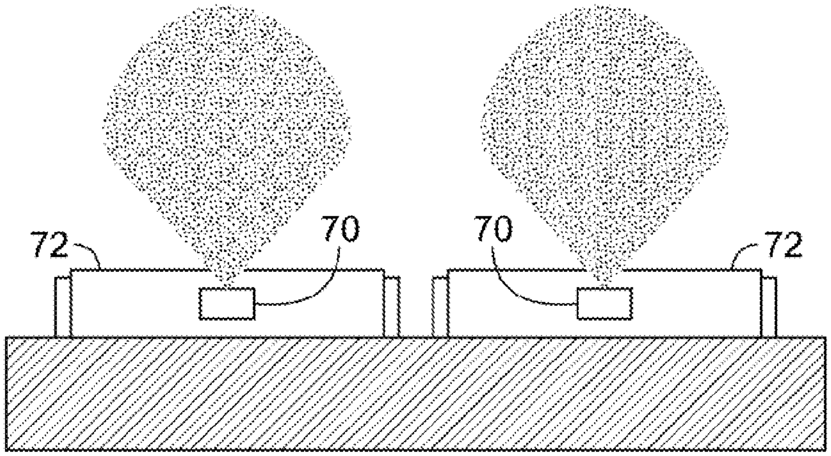
FIG. 6A shows a linear packaging arrangement of UV LED dies, according to an embodiment of the present invention.
Figure 6B:
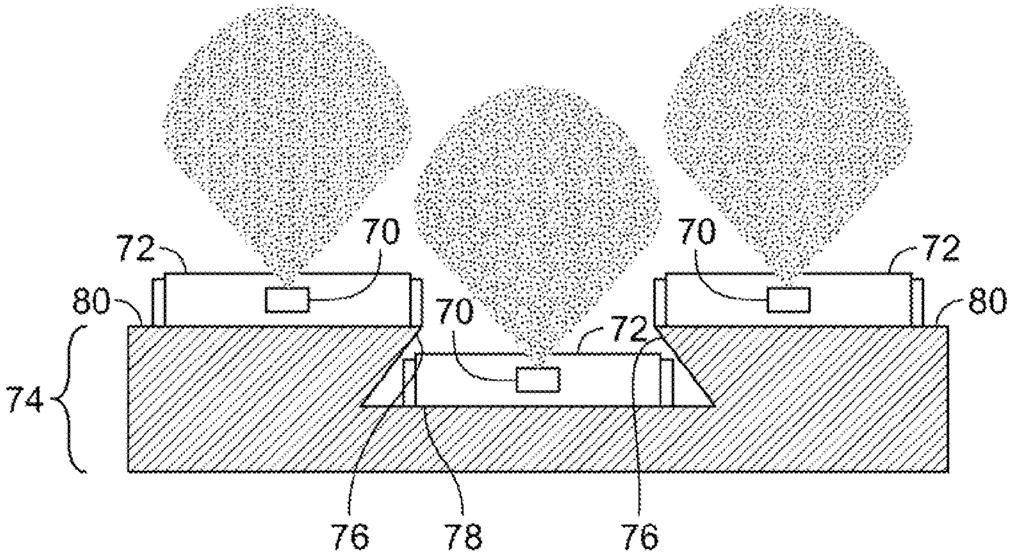
FIG. 6B shows a tiered packaging arrangement on a platform of UV LED dies, according to an embodiment of the present invention.

FIG. 6A shows a typical linear packaging arrangement of packaged UV LED dies, while FIG. 6B shows a tiered packaging arrangement of the UV LED dies, according to embodiments of the present invention. The LED dies 70 may be obtained commercially in a substantially transparent package 72 (e.g., commercially available devices such as the Nichia NC4U13xE). More than one diode may be included in a package 72. Alternatively, bare dies may be purchased and arranged linearly (FIG. 6A) or in a tiered fashion on a multi-level platform 74 (FIG. 6B).

Referring now to FIG. 6B, the irradiance pattern emitted by an individual LED die 70 within or not including a rectangular package 72 may be Lambertian (i.e., a cosine distribution). When the dies/diode packages 72 are arranged on multiple levels, the sidewalls 76 between a lower platform 78 and at least one upper platform 80 are angled or curved inward from the at least one upper platform 80 to the lower platform 78, such that the at least one upper platform 80 at least partially overlies the lower platform 78. (The exact shape of sidewalls are also dependent on the individual diodes output irradiance pattern.) In this way, the dies are arranged closer to each other than the case of when upper platforms are substantially perpendicular to lower platforms. As a result of the LED dies 70 being closer to each other, the combined irradiance pattern from the plurality of LED dies 70 has been shown to have about a 1.5 power increase per unit area over the conventional linear arrangement of FIG. 6A. Moreover, the spatial uniformity of irradiance for the tiered configuration is greater than that of a linear, single level configuration.

The tiered multi-level platform 74 may be provided with appropriate electrical connections and thermal management for diode operation, as in the standard planar platform shown in FIG. 6A.

The present invention has several advantages over traditional microwave powered lamps. LED-based UV curing lamps offer fewer environmental contaminants and lower operating costs over their life time. An LED-based lamp uses only the solid state device (diode) that have a service life times of many of thousands of hours. An LED-based lamp has essentially no consumable parts compared to the traditional microwave powered lamp. Using traditional optics, all of the emitted light from the LEDs may be focused on to a small area of a fiber (less than 500 microns), whereas present day curing platforms can only focus the output light to approximately 1 centimeter (10,000 microns). Therefore, a UV LED-based lamp can offer a much smaller footprint than microwave or arc lamps and can be better configured to fit around the cylindrical geometry of an optical fiber to be cured. In addition, LED lamps can be modularized in to smaller sections to permit custom designs. Both of these last two points can greatly reduce scattered light and therefore worker safety in an industrial environment.

Because of their presently limited monochromatic spectrum and low powers, traditional UV LED-based lamps typically suffer from insufficient curing results, due to oxygen inhibition and the desire for maximum process speeds. However, in the present invention, optical fiber coatings are (i) cured in a moderately oxygen-free environment, (ii) have small substrates, and (iii), rely primarily on the UVA (320-390 nm) band for curing. Thus, the entire optical output of UV LEDs of the present invention may be focused on the small fiber area to produce the large energy densities required for the high processing speeds used for curing optical fibers. Coating chemistry may be further optimized for the UVA band (where higher-power LEDs are available).

In applications where inert (low oxygen content) environments are used, short working distance may be employed. A UV LED-based lamp as outlined herein may be used to cure coatings on the interior (or exterior) of pipes where space is highly limited and the environment may be purged of oxygen to improve cure performance. Due to the availability of present day diodes, a high sensitivity of the chemistry to the UVA band is preferred, however, as the technology improves (LED wavelengths become shorter and output powers increase) UV LED-based lamps may be applied to a wider range of chemistries and therefore more applications. For instance, ink jet printing requires a close working distance, but the chemistry requires UVA and UVC (240-250 nm) bands and it is unattractive to purge the large substrates to reduce the oxygen inhibition problem. However, an LED-based lamp with both UVA and UVC wavelengths may greatly reduce these barriers, after significant advancements in UV LED materials and devices have been made.

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

What is claimed is:

1. An assembly for curing a work product, comprising:

a workpiece tube configured to receive the work product;

at least one optical component arranged substantially parallel to the workpiece tube; and an array of light emitting diodes (LEDs) arranged on a tiered platform having at least two levels, wherein a first LED is located on a first level of the tiered platform and a second LED is located on a second level of the tiered platform, wherein the second level of the tiered platform is closer to the lens than the first level of the tiered platform, and wherein light emitted from the array of LEDs is focused by the at least one optical component on the workpiece tube to cure the work product.

2. The assembly of claim 1, wherein the second level of the tiered platform at least partially overlaps the first level of the tiered platform such that the first and second LEDs are arranged closer together than if the first level of the tiered platform and the second level of the tiered platform did not overlap.

3. The assembly of claim 2, wherein a surface of the tiered platform connecting the first level of the tiered platform and the second level of the tiered platform is flat.

4. The assembly of claim 2, wherein a surface of the tiered platform connecting the first level of the tiered platform and the second level of the tiered platform is curved.

5. The assembly of claim 1, further including a curved reflector located substantially parallel to the workpiece tube and distal to the tiered platform, wherein the curved reflector is configured to refocus light emitted from the array of LEDs that escape the workpiece tube substantially back onto the workpiece tube.

6. The assembly of claim 5, wherein a curvature of the elongated curved reflector determines a working distance between the elongated curved reflector and the workpiece tube.

7. The assembly of claim 1, wherein the assembly is modular.

8. The assembly of claim 1, wherein the array of LEDs emit ultraviolet (UV) light of at least one wavelength.

9. The assembly of claim 1, wherein each one of the array of LEDs is a pre-packaged or bare die.

10. The assembly of claim 1, wherein each one of the array of LEDs emits light in a Lambertian pattern.

11. The assembly of claim 1, wherein a distance between the array of LEDs and the at least one optical component is substantially less than a distance between the at least one optical component and the workpiece tube.

12. The assembly of claim 1, wherein the at least one optical component is one of refractive optics, reflective optics, adaptive optics, and metamaterials.

13. The assembly of claim 12, wherein the at least one optical component is a lens.

14. The assembly of claim 1, wherein the lens forms a curved, half-cylinder with a substantially flat surface proximal to the workpiece tube.

15. The assembly of claim 1, wherein the workpiece tube is substantially hollow.

16. The assembly of claim 13, wherein the workpiece tube is substantially transparent to UV light.

17. The assembly of claim 14, wherein the workpiece tube is made of quartz.

18. The assembly of claim 13, wherein the workpiece tube is substantially filled with an inert gas.

19. The assembly of claim 13, wherein the workpiece is removably insertable in the workpiece tube.

* * * * *